Dec. 11, 1956  B. H. HADLEY  2,773,724
THRUST BLOCK
Filed Dec. 2, 1954

BENJAMIN H. HADLEY,
Inventor.
By His Attorneys.
HARRIS, KIECH, FOSTER & HARRIS.

United States Patent Office 2,773,724
Patented Dec. 11, 1956

2,773,724
THRUST BLOCK

Benjamin H. Hadley, Pomona, Calif.

Application December 2, 1954, Serial No. 472,719

3 Claims. (Cl. 308—1)

The present invention relates to a new and improved thrust block construction which has proved to be particularly advantageous in use in transmitting a thrust to a plurality of rotating spindles so as to move these spindles in a given direction, and so as to return these spindles to their initial position following such movement.

There have been developed drilling machines in which a plurality of drill spindles are simultaneously actuated by a worm gear acting through pinion gears surrounding separate spindles. In these constructions, it is necessary that means be provided for moving these drill spindles with respect to the driving worm, and for returning the drill spindles to their initial positions. In order to accomplish this purpose, the thrust block construction of the present invention has been developed in order to replace prior constructions utilized for substantially the same purpose.

The present thrust block construction is distinguished over the prior related devices utilized for the same purpose by virtue of its simplicity, its long, useful life, and the ease with which the appropriate wearing parts within the thrust block can be changed when necessary.

A more specific object of the invention is to provide a new and improved thrust block construction which includes a block provided with a generally cylindrical internal chamber, a bore aligned with said chamber, means for inserting an upper thrust washer within the upper portion of said chamber adjacent to said bore, and means for sealing a shaft within the lower portion of said chamber through the use of another thrust washer and upper and lower thrust washers used as described. A still more specific object of the instant invention is to provide a construction of the class described in which the lower thrust washer surrounds the top end of a rotating shaft, such as, for example, a drill spindle, and in which the top end of this shaft is provided with a cap pinned to the shaft, which cap is designed to be held in position within the chamber provided in the block between the two thrust washers described so that any wear encountered by virtue of the transmission of thrust loads through the thrust block will be received by these thrust washers.

Another object of the instant invention is to provide a construction as described in the preceding paragraphs, wherein the thrust washers employed are formed of a filled resinous material having extremely advantageous wear characteristics. A particularly suitable material for use in accomplishing this purpose is layers of cotton cloth impregnated with a phenolic resin. Other similar means, such as, for example, cloth filled urea formaldehyde, resins, can be utilized for the same purpose, however. Preferably, the resins employed in such use are thermosetting in character.

Another object of the present invention is to provide a thrust block construction of the category described in which means are provided adjacent said thrust block to prevent rotation of said thrust block in use, and in which means are provided in order to retain the thrust washers employed in position, said latter means being capable of being easily removed.

Further objects of the present invention, as well as the advantages of it, will be more fully apparent from the balance of this specification, the appended claims and the accompanying drawings, in which:

Figure 1:
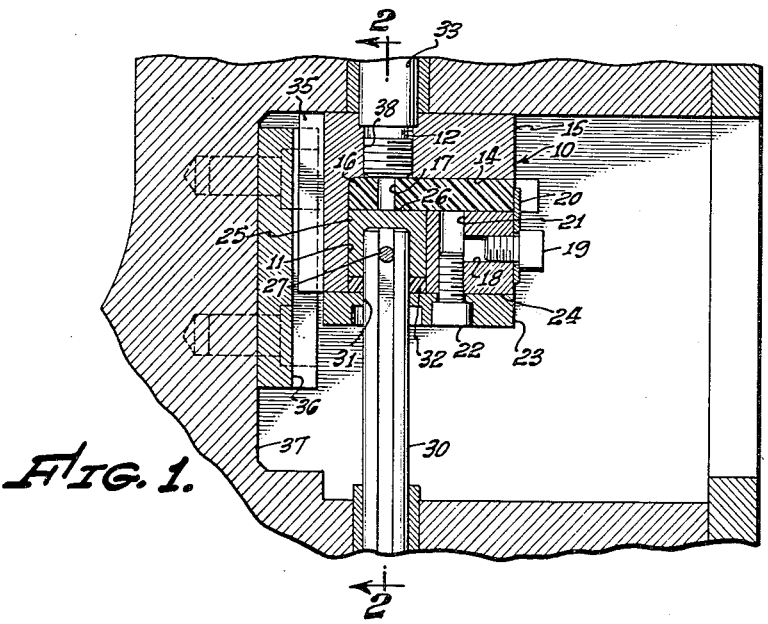
Fig. 1 shows a side sectional view of the device of the invention.
Figure 2:
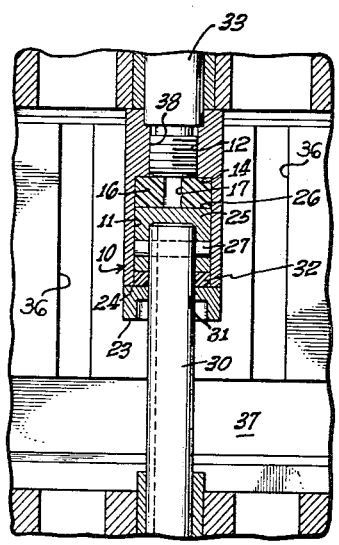
Fig. 2 is a view taken along the line 2—2 of Fig. 1.

From a detailed examination of these drawings it is seen that the new and improved thrust block construction herein described consists of a block 10 having an internal chamber 11 which is aligned with a bore 12 within the block. A substantially rectangular opening 14 is provided from adjacent the front end 15 of the block 10 to the portion of the chamber 11 adjacent the bore 12. In use, this opening 14, as well as the portion of the chamber 11 referred to, is adapted to be occupied by means of an upper thrust washer 16 formed of a material as previously described. Preferably, this upper thrust washer is provided with an aperture 17 aligned with the bore 12. The block 10 is provided with a tapped bore 18 projecting towards the chamber 11 from the front end 15 generally parallel to the rectangular opening 14. This bore 18 is adapted to carry a common bolt 19 retaining a spring-like lock plate 20 against the upper thrust washer 16 so as to at all times retain this upper thrust washer 16 within the block 10.

The block 10 is also provided with another bore 21 which extends generally parallel to the chamber 11 between this chamber and the front surface 15, and which is tapped so as to receive a common setscrew 22 serving to hold a retainer plate 23 adjacent the lower surface 24 of the block 10. Preferably, as indicated in Fig. 1 of the drawings, this lower surface is substantially flat in character. Disposed within the chamber 11 between the upper thrust washer 16 and the retainer 23 is a cap 25 of generally cylindrical configuration but having a closed end 26 which is pinned to the shaft 30 by means of a pin 27, a shaft 30 projecting into the chamber 11 through an opening 31 within the retainer 23. This cap 25 is spaced from the retainer 23 by means of a lower thrust washer 32 held against the retainer 23 and positioned around the shaft 30. Both the thrust washer 16 and the thrust washer 32 are preferably of a filled thermosetting resinous material as indicated above.

The particular construction shown is designed for use in transmitting a thrust load initially placed upon the thrust block by means of a push rod 33 projecting into the bore 12. When this occurs, the entire block 10 and attached pieces are forced in a generally downward position against the upper surface of the cap 25; that is, the surface of this cap 25 bearing against the upper thrust washer 16. Rotation of the thrust block 10 about the shaft 30 during this operation is prevented by means of an elongated protuberance 35 formed on the thrust block 10 on the opposite side of this block from the front end 15 and sliding within an appropriately shaped groove 36 formed into a supporting member 37. After the downward motion of the push rod 33 has been completed, the thrust block 10 may be pulled back into its initial position by means of an upward force being applied to the push rod 33. This upward force will be transmitted to the thrust block by means of threads 38 within the bore 12, and will cause the lower thrust washer 32 to bear against the lower surface of the adjacent surface of the cap 25, pulling the shaft 30 upwards. It is to be understood that throughout this operation, this shaft 30 and the connected cap 25 may be constantly rotated. Indeed, the invention, is designed for use under such conditions. It is further designed for use under such conditions that the push rod 33 is not rotated during use.

Those skilled in the art will realize that the herein described and disclosed invention is capable of modification within the scope of the instant disclosure. As an example of such permissible modification, various permanently biased spring means can be used instead of the bolt 19 and the setscrew 22. All such changes or alterations of this category which are considered to be within the skill of the art are to be considered as part of the present inventive concept insofar as they are defined by the appended claims.

I claim as my invention:

1. In a thrust block for a rotatable and reciprocable spindle, the combination of: a body member having a cylindrical chamber extending partially therethrough from one side thereof and adapted to receive an end of the spindle, said body member also having a lateral opening extending partially therethrough and intersecting said chamber, said body member also having a bore axially aligned with and connecting with said chamber; a first thrust washer in said chamber; a second thrust washer in said opening; first external means for partially closing the open end of said chamber at said one side and retaining said first thrust washer in said chamber; and second external means for retaining said second thrust washer in said opening.

2. In a thrust block for a rotatable and reciprocable spindle, the combination of: a body member having a cylindrical chamber extending partially therethrough from one side thereof and adapted to receive an end of the spindle, said body member also having a lateral opening extending partially therethrough and intersecting said chamber, said body member also having a bore axially aligned with and connecting with said chamber; a first thrust washer in said chamber; a second thrust washer in said opening; first external means for partially closing the open end of said chamber at said one side and retaining said first thrust washer in said chamber; second external means for retaining said second thrust washer in said opening; and lug means on said body and extending radially therefrom, said lug means being adapted to co-operate with stationary stop means to prevent rotation of said body member relative to the stop means.

3. In a thrust block device, the combination of: housing means having stop means therein; a rotatable and reciprocable spindle having an end extending into said housing; cup means on said end of said spindle and held against movement relative thereto; block means having a cylindrical chamber receiving said cup means, and having a lateral opening intersecting said chamber above said cup means; a first thrust washer in said chamber below and engaging one end of said cup means; a second thrust washer in said opening and engaging the other end of said cup means; means for retaining said washers in said block means; and lug means on said block means and engageable with said stop means to prevent rotational movement of said block means relative to said housing but permitting longitudinal movement therebetween.

References Cited in the file of this patent
UNITED STATES PATENTS

| | | |
|---|---|---|
| 705,749 | Gates | July 29, 1902 |
| 2,600,353 | Wightman | June 10, 1952 |